UNITED STATES PATENT OFFICE.

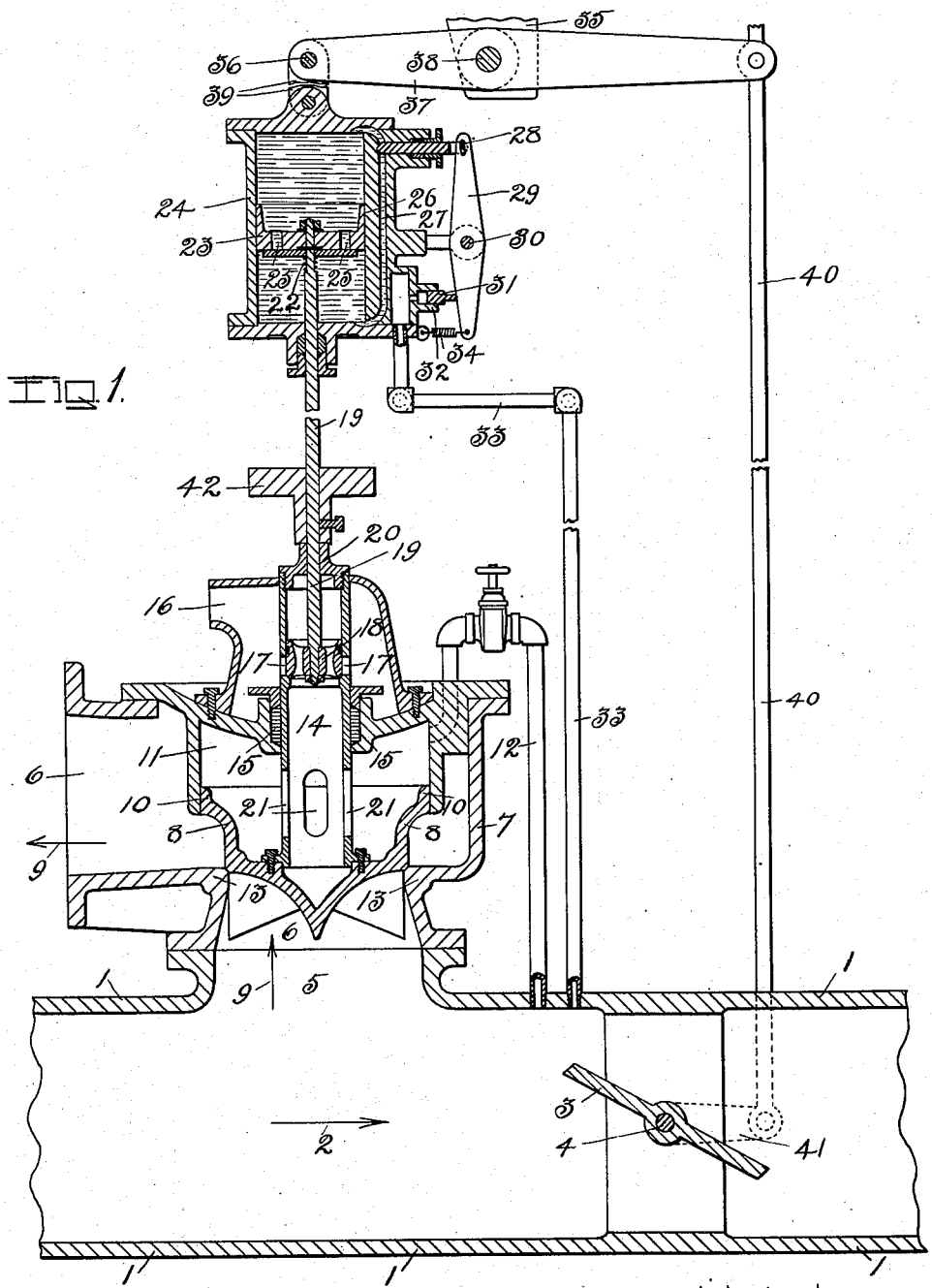

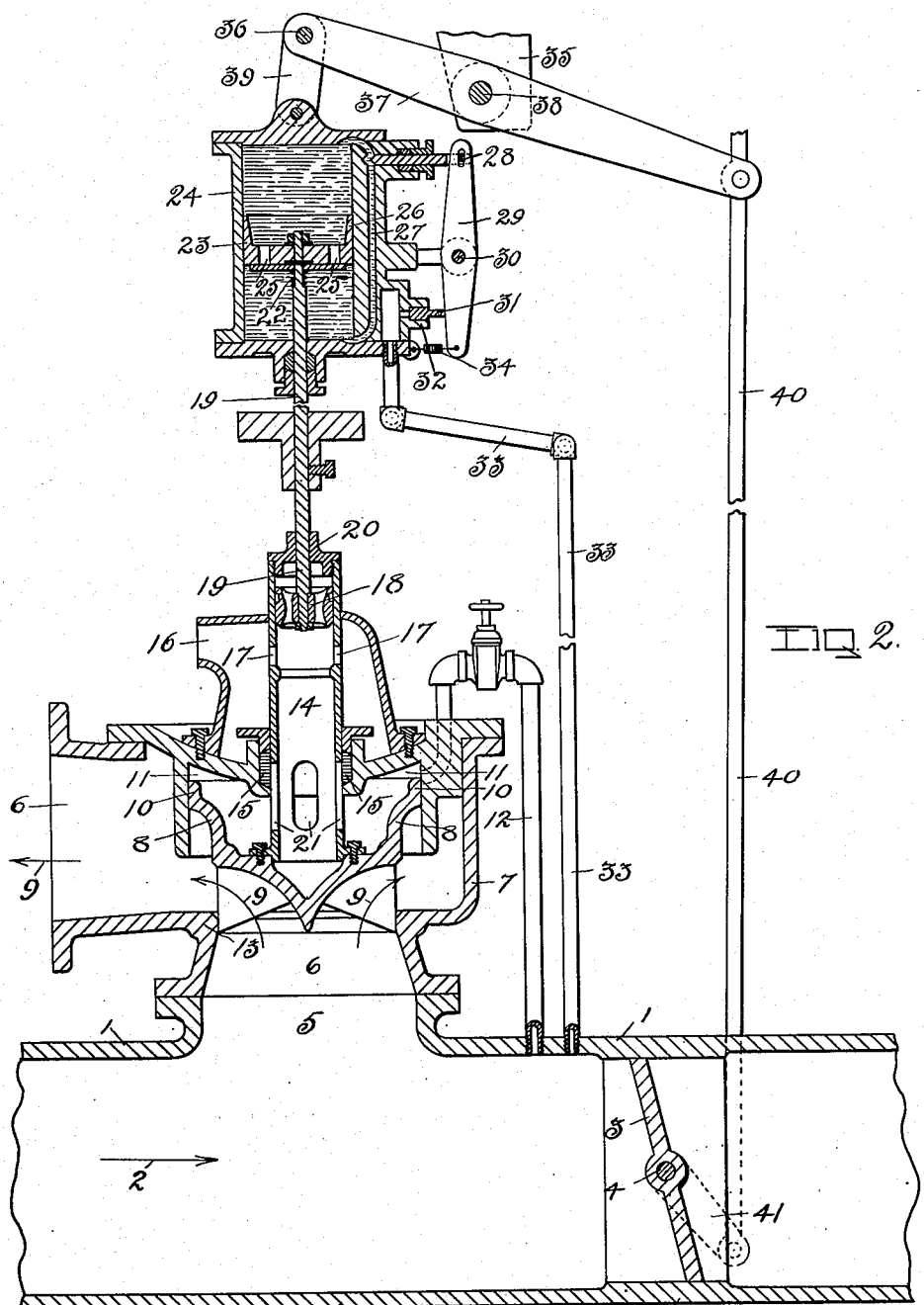

JOHN STURGESS, OF TROY, NEW YORK, ASSIGNOR TO STURGESS GOVERNOR ENGINEERING COMPANY, OF TROY, NEW YORK, A CORPORATION OF NEW YORK.

RELIEF-VALVE MECHANISM.

937,484.        Specification of Letters Patent.     Patented Oct. 19, 1909.

Application filed February 17, 1908. Serial No. 416,420.

*To all whom it may concern:*

Be it known that I, JOHN STURGESS, a subject of the King of Great Britain, residing at Troy, county of Rensselaer, and State of New York, have invented certain new and useful Improvements in Relief-Valve Mechanisms, of which the following is a specification.

The invention relates to such improvements and consists of the novel construction and combination of parts hereinafter described and subsequently claimed.

Reference may be had to the accompanying drawings, and the reference characters marked thereon, which form a part of this specification.

Similar characters refer to similar parts in the several figures herein.

Figure 1 of the drawings is a view in central, vertical, longitudinal section of my improved relief-valve, and the operating and controlling mechanism therefor, showing the relief-valve closed. Fig. 2 is a similar view showing the relief-valve open.

My invention consists both in a novel method of relieving a valve-controlled pressure-main from shocks due to a rise in pressure caused by closing or partly closing said valve, and in relief-valve mechanism forming one means for carrying said method into effect.

In certain of its features, my invention is applicable to various uses where it is desired to quickly relieve in an hydraulic main or a pipe-line a sudden rise in pressure due to the interruption or reduction of the flow by the closing or partial closing of a valve or gate.

The invention is particularly adapted for use with a pipe-line supplying a water-wheel or other hydraulic motor.

One of the objects of the invention is to accomplish simultaneously with the closing movement of the main-valve, controlling the flow of liquid, an opening movement of the relief-valve, whereby the rise of pressure which a closing or partial closing of the main-valve tends to induce in the pipe-line is anticipated, and relief is provided therefor before such increase in pressure actually takes place, so that no material shock on the pipe-line results from the closing or partial closing of the main-valve.

Another object of the invention is to utilize the hydraulic pressure of the pipe-line itself for closing and controlling the relief-valve, after the same has been so opened.

Another object of the invention is to regulate the rate of closing of the relief-valve by the degree of pressure in the pipe-line, instead of closing the relief-valve in a predetermined period.

Other objects of the invention will appear in connection with the following description.

So far as the general arrangement and location of the various parts of the apparatus are concerned, the drawings are merely diagrammatic, being in this respect intended for a simple illustration of the invention rather than for an accurate illustration of the invention applied to an actual or preferred form of pipe-line and main-valve, and it will be understood that the arrangement and relative location of the various parts of the apparatus can, without departing from my invention, be changed to meet the different conditions which arise in applying the invention to the different uses for which it is adapted.

Referring to the drawings, 1, represents an hydraulic main or a pipe-line through which fluid under pressure is transmitted in the direction of the arrow, 2, the flow thereof being regulated and controlled by a valve, 3, shown for convenience of illustration in the form of a simple butterfly valve mounted upon a horizontal shaft 4.

The water which passes the valve, 3, may be used for any desired purpose, as for operating a water-wheel or an hydraulic motor, not shown.

In close proximity to the main-valve, 3, on the inner or pressure side thereof is an outlet, 5, which communicates with a passageway, 6, leading through the case, 7, of the relief-valve 8. The relief-valve is adapted when in its lowermost position, as shown in Fig. 1, to close the passageway, 6, against the pressure in the main, 1, and when in its uppermost position to leave the passageway, 6, substantially unobstructed for the outflow therethrough of water from the main, 1, said outflow being in the direction of the arrows, 9. The back of this valve is in the form of a piston, 10, adapted to fit within a cylindrical pressure-chamber, 11, which is in communication through the pipe, 12, with the pipe-line at a point adjacent to the main-valve, 3, on the pressure side thereof.

The area of the back of the valve, 8, which is exposed to the pressure within the chamber, 11, is greater than the area of the opening inclosed by the seat, 13, for the valve, 8, so that the valve, 8, is automatically held to its seat by the excess of pipe-line-pressure on the back thereof so long as the pressure within the chamber, 11, is not relieved.

Fixed upon the valve, 8, is a hollow stem, 14, which passes upward through a stuffing-box, 15, and an outlet-chamber, 16, said hollow stem being provided with ports or apertures, 17, always in communication with said outlet-chamber, which apertures, 17, are adapted to be closed at certain times by a cylindrical valve, 18, fixed upon the lower end of the valve-rod 19. The upper end of the hollow stem, 14, is closed by a cap, 20, through which the valve-rod, 19, passes. The hollow stem, 14, is also provided with apertures, 21, communicating with the pressure-chamber 11.

So long as the apertures, 17, are closed by the valve, 18, no relief is afforded for the pressure within the chamber, 11, but when the valve, 18, is moved upward by means of the rod, 19, to uncover more or less of the openings, 17, the pressure within the chamber, 11, is relieved by the escape of water therefrom which passes through the apertures, 21, thence upwardly through the hollow stem, 14, out through the apertures, 17. When the pressure in the chamber, 11, is thus relieved, the total downward pressure upon the back of the valve, 8, becomes less than the upward pressure thereon directly from the pipe-line, so that the valve, 8, is automatically opened by such pipe-line pressure.

The upper end of the valve-rod, 19, is connected with a piston, 23, located within a cylinder, 24, filled with a suitable liquid, as oil, the piston being provided with apertures, 25, which are covered by a movable washer, 26, yieldingly held against the underside of the piston by means of a coil-spring, 22, adapted to yield when the cylinder, 24, is moved downward to permit the free passage of the oil from the upper to the lower side of the piston, 23, but adapted to prevent a reversal of such movement by automatically covering the apertures, 25, and preventing the passage therethrough of the oil from the lower to the upper side of said piston.

A gradual passage of the oil from the lower to the upper side of the piston, 23, is permitted through a duct, 27, leading through the cylinder wall and communicating at its ends with the opposite ends of the interior of the cylinder. The passage of the oil through this duct is controlled and regulated by means of a needle-valve, 28, the outer end of which is connected with one arm of a lever, 29, fulcrumed at, 30, upon the cylinder, 24, and having its other end adapted to be engaged by a plunger, 31, fitting and movable within a cylinder, 32, which is connected by a flexible pipe, 33, with the pipe-line near the main-valve on the inner side thereof.

The lever, 29, is held against the plunger, 31, by means of a coil-spring, 34, connecting said lever with a support, 35, carried by the cylinder 24. The strength of said coil-spring is sufficient to hold the plunger, 31, in the inner end of the cylinder, 32, so long as the pressure in the pipe-line does not exceed normal, but this strength is so regulated that said spring will yield in response to an excess of pressure in the pipe-line, thereby permitting the needle-valve, 28, to be closed or partly closed by the outward movement of the plunger, 31, due to said excess of pressure.

The cylinder, 24, is pivotally mounted at, 36, by means of a link, 39, upon one arm of a lever, 37, fulcrumed at, 38, upon a fixed support, 35, the other arm of said lever being connected by a link or rod, 40, with a rocker-arm, 41, fixed upon the shaft, 4, of the main-valve 3.

The operation of the apparatus is as follows: A closing movement of the main-valve, 3, which may be induced in any known manner, imparts a quick downward movement to the rocker-arm, 41, rod, 40, and the end of the lever, 37, which is connected with said rod, causing the other end of the lever, 37, to move upward and to carry therewith the cylinder 24. As the oil within the cylinder, 24, can pass from the lower to the upper side of the piston, 23, only very gradually through the duct, 27, the quick upward movement of the cylinder, 24, causes said cylinder, the piston, 23, the piston-rod, 19, and the valve, 18, all to move upward together as a substantially solid or rigid element, thereby opening the apertures or ports, 17, in the hollow stem, 14, and thus relieving the pressure within the chamber, 11, so that the relief-valve, 8, is opened by the direct upward pressure from the pipe-line 1. The opening of the valve, 8, at once permits the escape through the outlet passage, 6, of a part of the contents of the pipe-line, 1, to relieve or prevent an excess of pressure in the pipe-line, due to the closing or partial closing of the main-valve 3. As soon, however, as the operation thus far described has been accomplished, the piston, 23, begins to descend, due to its own weight and that of the connected parts, which weight is preferably supplemented by an additional weight, 42, fixed upon the valve-rod, 19, which downward movement of the piston proceeds as rapidly as the passage of the oil through the duct, 27, permits, and which downward movement continues until the valve, 18, closes the apertures, 17, in the hollow stem, 14, of the relief-valve, whereupon the chamber, 11, again becomes a closed chamber in communication only with the water under pressure in the pipe-line, which pressure within the chamber, 11, tends to force the relief-valve, 8, downward toward its seat. This downward movement of the relief-valve, however, can proceed only at the same speed as the downward movement of the piston, 23, and the valve, 18, because as soon as the valve, 8, tends to gain upon the valve, 18, in the downward movement, the apertures, 17, again become opened, relieving to some extent the pressure within the chamber 11. The strength of the spring, 34, being proportioned to offset the normal pressure in the pipe-line, an excess of pressure in the pipe-line will force the plunger, 31, outward, operating the lever, 29, to force the needle-valve, 28, inward to more fully close the duct, 27, and thus reduce the speed at which the piston, 23, is permitted to descend. The relief-valve, 8, is thus permitted to be moved toward its seat only so long as the pressure in the pipe-line remains normal, or less than normal. The rod, 40, may, if desired, be connected with any mechanism for operating the main-valve.

What I claim as new and desire to secure by Letters Patent is:—

1. In an apparatus of the class described, the combination with an hydraulic pressure-main; and a main-valve controlling the flow therethrough; of a relief-valve controlling an outlet from said main near said main-valve on the inner side thereof; mechanism for inducing an opening movement of said relief-valve; and means for positively operating said mechanism simultaneously with a closing movement of said main-valve independently of the pressure in said main.

2. In an apparatus of the class described, the combination with an hydraulic pressure-main; and a main-valve controlling the flow therethrough; of a relief-valve controlling an outlet from said main near said main-valve on the inner side thereof; mechanism for inducing an opening movement of said relief-valve; means for positively operating said mechanism simultaneously with a closing movement of said main-valve independently of the pressure in said main; and means for gradually closing said relief-valve independently of said main-valve.

3. In an apparatus of the class described, the combination with an hydraulic pressure-main; and a main-valve controlling the flow therethrough; of a relief-valve controlling an outlet from said main near said main-valve on the inner side thereof; mechanism for inducing an opening movement of said relief-valve, comprising in part an automatically expanding element whereby a gradually closing movement of the relief valve is induced independently of the main-valve; and means for positively operating said mechanism simultaneously with a closing movement of said main-valve independently of the pressure in said main.

4. In an apparatus of the class described, the combination with an hydraulic pressure-main; and a main-valve controlling the flow therethrough; of a relief-valve controlling an outlet from said main near said main-valve on the inner side thereof; mechanism for inducing an opening movement of said relief-valve comprising in part a piston and a liquid-filled cylinder provided with means for gradually permitting the flow of liquid from one side to the other of said piston; and means for positively operating said mechanism simultaneously with a closing movement of said main-valve independently of the pressure in said main.

5. In an apparatus of the class described, the combination with an hydraulic pressure main; and a main-valve controlling the flow therethrough; of a relief-valve controlling an outlet from said main near said main-valve on the inner side thereof; and mechanism whereby a closing movement of the main-valve is automatically accompanied by a simultaneous opening movement of the relief-valve, and whereby a closing movement of the relief-valve is induced independently of the main-valve, said mechanism comprising in part a piston, a liquid-filled cylinder provided with means for gradually permitting the flow of liquid from one side to the other of said piston; a valve controlling the flow of said liquid; and means whereby the position of said last mentioned valve is controlled by the pressure in said main.

6. In an apparatus of the class described, the combination with an hydraulic pressure main; and a main-valve controlling the flow therethrough; of a relief-valve-seat surrounding an outlet leading from said main near said main-valve on the inner side thereof; a pressure chamber in communication with said main near said main-valve on the inner side thereof; a relief-valve movable to and from said seat, and having exposed to the pressure in said pressure chamber a back surface greater in area than the area inclosed by said valve seat; a valve controlling an outlet leading from said pressure chamber; and connections between said last mentioned valve and the main-valve-operating mechanism, whereby a closing movement of said main-valve is accompanied by the opening of the outlet from the pressure chamber.

7. In an apparatus of the class described, the combination with an hydraulic pressure main; and a main-valve controlling the flow therethrough; of a relief-valve-seat surrounding an outlet leading from said main near said main-valve on the inner side thereof; a pressure chamber in communication with said main near said main-valve on the inner side thereof; a relief-valve movable to and from said seat, and having exposed to the pressure in said pressure chamber a back surface greater in area than the area inclosed by said valve seat; a valve controlling an outlet leading from said pressure chamber; and positively-operated mechanism whereby an opening movement of the last mentioned valve is induced by a closing movement of the main-valve, said mechanism comprising in part an automatically expanding element having a movable member connected with the valve controlling said outlet from the pressure chamber, whereby said last mentioned valve is closed independently of the main-valve.

8. In an apparatus of the class described, the combination with an hydraulic pressure main; and a main-valve controlling the flow therethrough; of a relief-valve-seat surrounding an outlet leading from said main near said main-valve on the inner side thereof; a pressure chamber in communication with said main near said main-valve on the inner side thereof; a relief-valve movable to and from said seat, and having exposed to the pressure in said pressure chamber a back surface greater in area than the area inclosed by said valve seat; a valve controlling an outlet leading from said pressure chamber; and connections between said last mentioned valve and the main-valve-operating mechanism, whereby a closing movement of said main-valve is accompanied by the opening of the outlet from the pressure chamber, said connections comprising in part a piston, and a liquid-filled cylinder provided with means for gradually permitting the flow of liquid from one side to the other of said piston.

9. In an apparatus of the class described, the combination with an hydraulic pressure main; and a main-valve controlling the flow therethrough; of a relief-valve-seat surrounding an outlet leading from said main near said main-valve on the inner side thereof; a pressure chamber in communication with said main near said main-valve on the inner side thereof; a relief-valve movable to and from said seat, and having exposed to the pressure in said pressure chamber a back surface greater in area than the area inclosed by said valve seat; a valve controlling an outlet leading from said pressure chamber; and connections between said last mentioned valve and the main-valve-operating mechanism, whereby a closing movement of said main-valve is accompanied by the opening of the outlet from the pressure chamber, said connections comprising in part a piston, and a liquid-filled cylinder provided with means for gradually permitting the flow of liquid from one side to the other of said piston; a valve controlling the flow of said liquid; and means whereby the position of said last mentioned valve is controlled by the pressure in said main on the inner side of said main-valve.

10. In an apparatus of the class described, the combination with an hydraulic pressure-main; and a main-valve controlling the flow therethrough; of a relief-valve controlling an outlet from said main near said main-valve on the inner side thereof; mechanism for inducing an opening movement of said relief-valve; means for positively operating said mechanism simultaneously with a closing movement of said main-valve independently of the pressure in said main, and whereby a closing movement of said relief-valve is automatically induced independently of said main-valve, said mechanism comprising in part a member responsive to an excess of pressure in said main and adapted to control the rate or interval of closing of said relief-valve.

11. That improvement in the art of relieving a valve-controlled pressure-main from shock due to a rise in pressure caused by closing or partly closing said valve, which consists in positively opening an outlet from said main near said valve on the inner side thereof simultaneously with a closing movement of said valve, and in advance of the rise in pressure due to the closing movement thereof, and thereafter closing said outlet at such a rate as to maintain the pressure in said main substantially normal.

12. That improvement in the art of relieving a valve-controlled pressure-main from shock due to a rise in pressure caused by closing or partly closing said valve, which consists in automatically positively opening an outlet from said main near said valve on the inner side thereof simultaneously with a closing movement of said valve, and in advance of the rise in pressure due to the closing movement thereof, and thereafter automatically closing said outlet at such a rate as to maintain the pressure in said main substantially normal.

In testimony whereof, I have hereunto set my hand this 6th day of February, 1908.

JOHN STURGESS.

Witnesses:
FRANK C. CURTIS,
J. DONSBACH.